United States Patent
Kingston

[11] Patent Number: 5,733,390
[45] Date of Patent: *Mar. 31, 1998

[54] CARBON-TITANIUM COMPOSITES

[75] Inventor: William R. Kingston, Chino Hills, Calif.

[73] Assignee: Ticomp, Inc., Chino, Calif.

[*] Notice: The term of this patent shall not extend beyond the expiration date of Pat. No. 5,693,157.

[21] Appl. No.: 568,530

[22] Filed: Dec. 7, 1995

Related U.S. Application Data

[63] Continuation of Ser. No. 139,091, Oct. 18, 1993, abandoned.

[51] Int. Cl.$^6$ .................... C23C 16/00; C23C 28/02
[52] U.S. Cl. .................... 148/537; 148/518; 148/527; 427/388.1; 427/376.8; 156/153; 156/281; 156/330
[58] Field of Search .................... 148/421, 516, 148/518, 537, 670, 527; 428/608, 622, 634, 635, 457, 614, 626, 660, 668, 670; 427/388.1, 376.8; 156/153, 281, 330

[56] References Cited

U.S. PATENT DOCUMENTS

| | | | |
|---|---|---|---|
| 3,758,234 | 9/1973 | Goodwin . | |
| 3,888,661 | 6/1975 | Levitt et al. . | |
| 3,936,277 | 2/1976 | Jakway et al. . | |
| 3,991,928 | 11/1976 | Friedrich et al. . | |
| 4,029,838 | 6/1977 | Chamis et al. . | |
| 4,115,611 | 9/1978 | Stoltze et al. . | |
| 4,132,828 | 1/1979 | Nakamura et al. . | |
| 4,137,370 | 1/1979 | Fujishiro et al. | 428/670 |
| 4,141,802 | 2/1979 | Duparque et al. . | |
| 4,356,678 | 11/1982 | Andrews et al. . | |
| 4,411,380 | 10/1983 | McWithey et al. . | |
| 4,473,446 | 9/1984 | Locke et al. . | |
| 4,489,123 | 12/1984 | Schijve et al. | 428/213 |
| 4,500,589 | 2/1985 | Schijve et al. | 428/213 |
| 4,624,897 | 11/1986 | Ito | 428/660 |
| 4,753,850 | 6/1988 | Ibe et al. . | |
| 4,775,602 | 10/1988 | Rasch | 428/668 |
| 4,777,098 | 10/1988 | Takamura et al. | 428/670 |
| 4,816,347 | 3/1989 | Rosenthal et al. | 428/615 |
| 4,917,968 | 4/1990 | Tuffias et al. | 428/668 |
| 4,935,291 | 6/1990 | Gunnink . | |
| 4,956,026 | 9/1990 | Bell | 148/527 |
| 4,992,323 | 2/1991 | Vogelesang et al. . | |
| 5,001,419 | 3/1991 | Grunke et al. | 428/660 |
| 5,008,157 | 4/1991 | Paxos | 428/670 |
| 5,009,966 | 4/1991 | Garg et al. | 428/660 |
| 5,039,571 | 8/1991 | Vogelesang et al. | 428/213 |
| 5,076,875 | 12/1991 | Padden | 457/304 |
| 5,079,101 | 1/1992 | Murayama | 528/623 |
| 5,100,737 | 3/1992 | Colombier et al. | 428/634 |

(List continued on next page.)

OTHER PUBLICATIONS

NASA CR-1859, "Analytical and Experimental Investigation of Aircraft Metal Structures Reinforced with Filamentary Composites—Phase I—Concept Development and Feasibility," S. Oken and R.R. June, 129 pages (1969–1970).

NASA CR-2039, "Analytical and Experimental Investigation of Aircraft Metal Structures Reinforced with Filamentary Composites—Phase II—Structural Fatigue, Thermal Cycling Creep, and Residual Strength," B. Blichfeldt and J.E. McCarty, 111 pages (1969–1970).

*Primary Examiner*—John Sheehan
*Attorney, Agent, or Firm*—Sheldon & Mak

[57] ABSTRACT

A method of combining a beta titanium alloy with advanced carbon composites, the combination having a matched yield strength and modules of elasticity ratio. When the combination is adhesively bonded both parts will approach maximum yield strength and fail at a similar amount of total strain. The titanium and carbon composites are combined by first abrading the titanium to be bonded, coating the titanium with platinum, aging the titanium, spraying primer on the coated titanium, applying adhesive to the primer side of the titanium and then applying the carbon to the adhesive. This allows the carbon composite to bond securely to the titanium. This composite uses the best properties of each component, the combination having a better set of properties than either part.

12 Claims, 3 Drawing Sheets

U.S. PATENT DOCUMENTS

| | | | |
|---|---|---|---|
| 5,104,460 | 4/1992 | Smith, Jr. et al. | 148/527 |
| 5,122,422 | 6/1992 | Rodhammer et al. | 428/634 |
| 5,160,771 | 11/1992 | Lambing et al. | 428/57 |
| 5,200,004 | 4/1993 | Verhoeven et al. | 148/527 |
| 5,213,904 | 5/1993 | Banker | 428/651 |
| 5,215,832 | 6/1993 | Hughes et al. | 428/623 |
| 5,232,525 | 8/1993 | Smith et al. | 148/514 |
| 5,242,759 | 9/1993 | Hall | 428/610 |
| 5,260,137 | 11/1993 | Rosenthal et al. | |
| 5,403,411 | 4/1995 | Smith et al. | 148/514 |
| 5,429,877 | 7/1995 | Eylon | 428/586 |
| 5,460,774 | 10/1995 | Bachelet | 419/5 |

FIG. 1

| MATERIAL | YIELD STRENGTH x 10³ PSI | DENSITY LBS / IN³ | SPECIFIC STRENGTH x10³ INCH-LBS. |
|---|---|---|---|
| 301 STAINLESS STEEL | 130 | .286 | 455 |
| A1 7075 T6 | 65 | .101 | 644 |
| T1 6A1 4V | 120 | .163 | 736 |
| 5 LAYER BETA Ti/CARBON COMPOSITE | 305 | .101 | 3,040 |

FIG. 2

| MATERIAL | FASTENER PULL THROUGH (a) | COMPRESSION AFTER IMPACT (b) |
|---|---|---|
| AS4 3501-6 QUASI-ISOTROPIC | 67 KSI | 22-32 KSI |
| TITANIUM/CARBON COMPOSITE | 125 KSI | 60 KSI |

(a) DOUBLE LAB SHEAR OR PIN BEARING; FASTENER DIAMETER = 0.3125 IN (b) .25" SAMPLE AT 1500 IN-LB/IN; HERCULES® DATA

CARBON-TITANIUM COMPOSITES

This is a continuation of application Ser. No. 08/139,091 filed on Oct. 18, 1993 now abandoned.

BACKGROUND OF THE INVENTION

The aircraft industry has been moving toward light weight advanced composites for several years due to their high specific strength. The disadvantage of composites and the reason metals still dominate primary structures include damage sensitivity, low bearing strength, and fastening difficulties. One recent advance to address several of these problems is a composite called Arall. Arall is a composite of aluminum and an Aramid/epoxy composite. It consists of skins of aluminum and a core of Aramid adhesively bonded to each other. The complete construction is covered in U.S. Pat. No. 4,500,589 and a similar product, Glair, is disclosed in U.S. Pat. No. 5,039,571. A disadvantage of Arall and Glair is the mismatch of the ratio between their modulus of elasticity and their yield strength. For instance, with Arall, the Aramid composite has a typical unidirectional yield strength of 172,000 psi and a modulus of $12.2 \times 10^6$ psi and the aluminum has a yield strength of 50,000 psi and modulus of $10.0 \times 10^6$ psi. When the Aramid fiber is stressed to it's maximum yield strength the aluminum will be stressed to 141,000 psi, which is well above it's maximum limit. Conversely, if the aluminum is stressed to 50,000 psi the Aramid fiber will be stressed to 61,000 psi, which leaves the Aramid fiber under utilized on a strength basis. The standard alpha-beta alloys of titanium have similar disadvantages. The industry has not used the newer beta alloys of titanium, which possess higher strength and lower modulus of elasticity, for composites because the adhesives normally used will not stick adequately to the titanium oxide surface layer as it exists on the newer beta alloys.

Others have developed methods of treating the standard alpha-beta alloys of titanium like Ti 6AL—4V so that they can be bonded to carbon fiber composites, however these methods do not work with the beta alloys of titanium like Timetal 15-3 and Timetal 21s. As explained above, the current metal/composite combinations, including Ti 6Al—4V, are inefficient because the composites can not use their full strength.

Therefore, there is a need for an inexpensive, safe and effective method for bonding the newer beta alloys of titanium with carbon fiber composite material.

SUMMARY OF THE INVENTION

The invention and method combines titanium and carbon fibers to form a composite structure with superior strength and damage resistance. The titanium used is a beta alloy which in this case is Timetal® 15-3 that is formed into its basic shape in the solution treated condition and then aged to final strength. The strength and modulus of elasticity of the beta alloys of titanium can be varied greatly by varying the processing time and temperature. The strength and modulus of the titanium can then be matched to the strength and modulus of the carbon composite.

Before aging, the titanium is cleaned by placing the titanium in a hot caustic solution followed by a hydrofluoric/nitric acid pickle. The side of the titanium that is to be bonded to the carbon is sandblasted with aluminum oxide grit. A metallic coating, such as platinum or its functional equivalent, is then applied to the cleaned surface. The coated titanium is then aged to final strength which simultaneously bonds the coating to the titanium. The titanium is then cleaned and primed with BAR 127. The carbon composite can now be bonded to the primed side of the titanium using an adhesive. The carbon fiber is then cured in a press or an autoclave which yields a resulting shape that has a much higher specific strength then other products.

Therefore it is the object of the present invention to provide an effective method of bonding a beta titanium alloy to carbon fiber material to produce a composite material that has superior specific strength and damage tolerance.

It is a further object of the invention to match the ratio of the modulus of elasticity and yield strength for titanium to that of carbon fiber so the maximum performance can be achieved from the combined materials.

Finally, it is the object of the invention to utilize the enhanced properties of the new composite in structures that benefit from the improved properties.

Other objects and many of the attendant advantages of the invention will become more apparent in the following description and the accompanying drawings in which, like numerals, refer to like parts.

BRIEF DESCRIPTION OF THE DRAWINGS

FIG. 1 shows a chart comparing yield strength, density and specific strength for currently used materials with the same properties of the present invention.

FIG. 2 shows the damage tolerance of the carbon/titanium composite vs. an all carbon composite.

PREFERRED EMBODIMENT OF THE INVENTION

Figure 3:
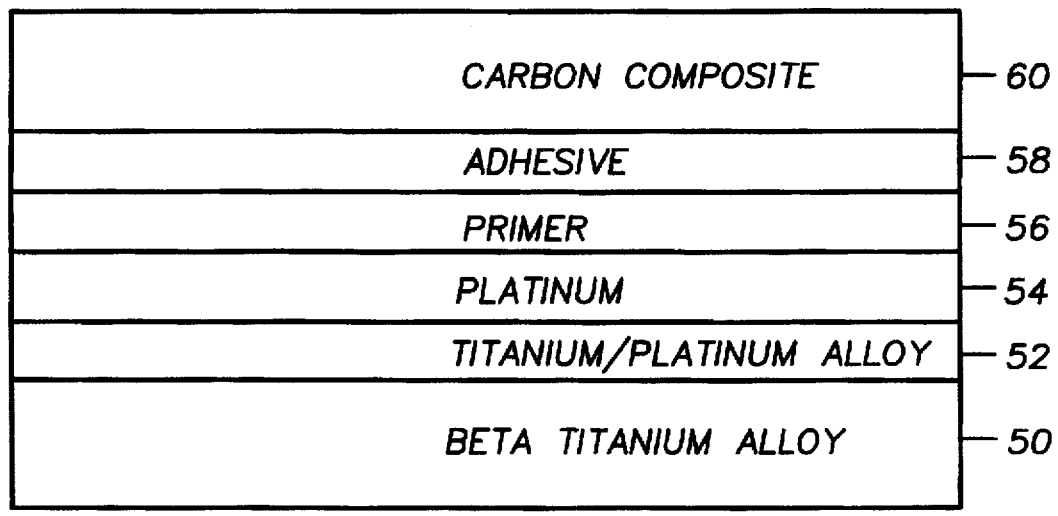
FIG. 3 shows a section view of the present invention after the graphite has been bonded and cured with the titanium.

This invention arose from an aerospace industry need for reducing the weight of primary structures without sacrificing key secondary properties such as strength and damage tolerance. Specifically, this invention bonds a beta titanium alloy with graphite fiber that utilizes the best properties of each without sacrificing the load carrying contribution of each part due to a mismatch of the modules of elasticity. This invention uses a beta titanium alloy such as TIMETAL® 15-3 (Ti—15V—3Cr—3Sn—3Al) (available from Titanium Metals Corporation, Denver, Colo. that is bonded to a high-strength graphite/epoxy composite. In the case of the carbon/titanium composite, a carbon/epoxy composite made from Hercules carbon fiber AS4 has a unidirectional tensile strength of 220,000 psi and a modulus of elasticity of $16 \times 10^6$ psi (data courtesy NASA Lewis Research Center). The titanium alloy Timetal 15-3 has been cold reduced from the solution treated condition by 50% which gives it a tensile strength of 173,000 psi and a modulus of elasticity of $12.4 \times 10^6$ psi. The cold reduction of 50% is accomplished at the factory by rolling a 0.020" strip of titanium alloy in the solution treated condition to a thickness to 0.010". Cold reductions of greater or lesser percentages can be ordered from the factory and can be used to match the strength and the modulus of the titanium alloy to the strength and the modulus of the carbon fiber composite. In this instance, the modulus of elasticity for the titanium alloy is matched to the modulus of elasticity for the Hercules carbon fiber. Thus, under the same total strain, the titanium will be stressed to 170,000 psi and the graphite/epoxy will be stressed to 220,000 psi. Thus, each element of the composite will reach its stress limit at about the same time giving the combination a superior specific strength with neither constituent underutilized. The titanium can be processed to yield other strength and modulus combinations which will be appropriate for use with other types of fibers. For instance, using Hercules IM8 fiber, which has a unidirectional tensile strength of approximately 380,000 psi and a modulus of elasticity of $27 \times 10^6$ psi, the same titanium alloy should be aged at 950 degrees fahrenheit for 8 hours to have a tensile strength of 224,000 psi and a modulus of elasticity of $16.3 \times 10^6$ psi. Thus, under maximum strain conditions, the titanium will be stressed to 224,000 psi and the Hercules IM8 composite will be stressed to 371,000 psi. Each component of the composite is stressed to near its maximum at approximately the same total strain. Other fibers like $S_2$-Glass and boron can also be used for specific applications. Boron, for instance, in compression has a strength of 400,000 psi and a modulus of $30 \times 10^6$ psi, which in similar layups would stress the 15-3 titanium to 217,000 psi. The same principle will work with high modules carbon and aluminum or high modulus carbon and steel alloys although these composites cannot achieve the high specific strength of the beta titanium alloy and carbon fiber composites. An aluminum alloy, like 7075-T6, or a high strength steel alloy, like fully hard 301 stainless steel can be bonded to a high-modules graphite/epoxy, composite. In the case of the aluminum/graphite composite where the graphite/epoxy composite has a tensile strength of 122,000 psi and a modules of $27.5 \times 10^6$ the bonded aluminum will be stressed to 46,000 psi which is within the stress limit of 7075-76. In the case of the steel/graphite composite where the graphite/epoxy composite has a tensile strength of 122,000 psi and a modules of $27.5 \times 10^6$ the bonded steel will be stressed to 133,000 psi, which is within the stress limits of 301 stainless steel.

This invention is constructed, in the case of the titanium/carbon composite by forming a basic shape from the TIMETAL® 15-3 in the solution treated condition. This shape is then cleaned and then sandblasted with a aluminum oxide grit. The sandblasted surface then has a thin coating of platinum or a functional equivalent material deposited on its surface. The shape is then aged at the correct time and temperature for the desired titanium properties. The proper time and temperature for aging is found by empirically testing the alloy for stress, strain and modulus after aging at a particular temperature for a given time. Aging the coated titanium further bonds the surface coating to the titanium. The bonding takes place because the titanium becomes chemically active at the aging temperatures causing the surface oxide to go into solution which in turn allows the surface coating to chemically bond to the titanium. Care is taken to not allow the surface coating to be totally absorbed into the titanium during aging which would leave the titanium alloy with a titanium oxide surface coating that is unacceptable. A balance is struck between the time and temperature of the aging process that produces the desired strength and modulus and at the same time absorbs only so much of the surface coating so that there is a chemical bond between the surface coating and the titanium and so the surface coating is not totally absorbed into the titanium. The shapes are cleaned and then primed with BAR 127 primer. This leaves the surface coating bonded to the titanium and the primer bonded to the surface coating, eliminating the problem encountered when trying to bond the primer to the titanium oxide coating that is always present on the titanium metal. These surfaces are then selectively strengthened by placing carbon fabric or unidirectional pregreg tape in exactly the place and amount that will yield the required strength for that particular part. The part is then hot cured in a standard way either in a press or autoclave. The resulting part has a much higher specific strength and thus a lower weight for a given strength than the part it replaces.

Figure 6:
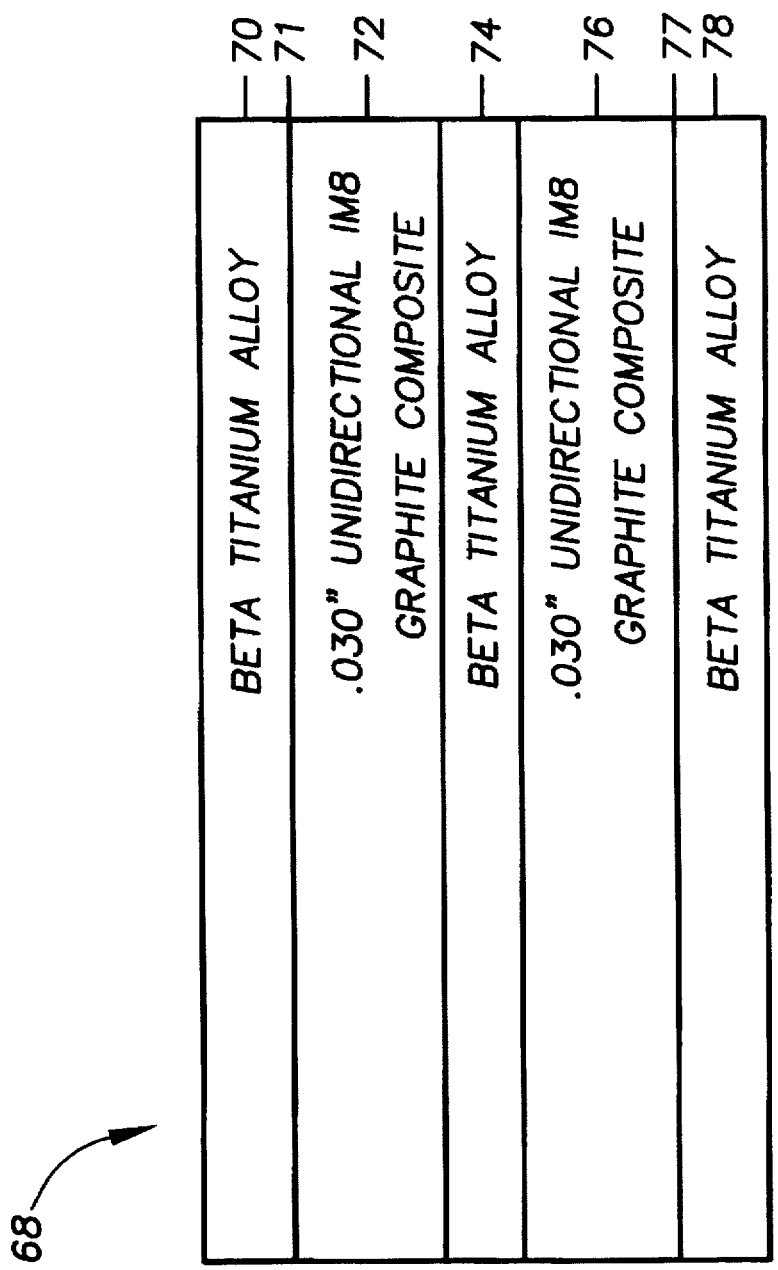
FIG. 6 shows a titanium/carbon composite that can be used as a lightweight replacement for the skin of aircraft.

FIG. 1 is a chart comparing the specific strengths of common aerospace materials with the specific strengths of a 5 layer laminate having 3 plies of 0.010" Timetal® 15-3 sheet and 2 layers of unidirectional 1M8 carbon/epoxy fiber that are 0.030" thick each. FIG. 6 is a side view of the 5 layer laminate with a specific strength of 3,040,000 inch-lbs. in the L direction. It can be seen that the carbon/titanium composite has the highest specific strength of any of the combinations. This high specific strength allows reduction in the overall weight by approximately 60% for airplane skin.

The specific strength of an all carbon composite structure can be even higher than the titanium/carbon composite. The disadvantage of all carbon composites is their sensitivity to damage. Two tests show the advantage of the carbon/titanium composite over the all carbon composite. These tests are the fastener pull-through test and the compression after impact test. FIG. 2 shows the results of these two tests. In both cases the carbon/titanium composite was approximately twice as strong as the all carbon composite.

To make a part having an adhesion between two strips of beta titanium, according to the present invention the titanium has to be prepared so that the adhesive will effectively bond to the titanium. Normally, the titanium oxide coating that protects the beta titanium alloy will not bond effectively to the adhesive. This is evidenced by the industry standard wedge crack test. In this test a wedge is inserted between the strips of titanium, cracking the adhesive. The strips of titanium, with the inserted wedge and cracked adhesive are then placed in a humidity chamber. This leaves a strain on the remaining adhesive/titanium bond line under an elevated temperature and high humidity conditions (140 degrees, 95% relative humidity). Using industry standard surface preparation methods, like anodizing, the beta alloys of titanium will completely fail this test with the adhesive completely slicking off the titanium.

In the method of the present invention, the titanium is sandblasted with aluminum oxide grit. The aluminum oxide grit is of 100 mesh and is sandblasted under approximately 40 psi of air pressure. This sandblasting creates the irregular surface. This irregular surface is then electrolytically plated with platinum. Nickel and functionally equivalent materials should also be effective as a coating agent. The titanium is then aged at approximately 950 degrees fahrenheit for 8 hours. This strengthens the bond between the titanium and the coating by causing the oxide layer of the titanium to defuse into the base of the titanium and leaving the coating to penetrate the surface of the titanium and causing an alloy of titanium and platinum to form at the interface. This irregular, coated surface is then primed with a standard primer such as BAR 127 and then adhesively bonded with an adhesive such as AF163-2. It is estimated that the surface area of the titanium strips increased by approximately 100% by the sandblasting, which dramatically increases the available area for surface adhesion.

FIG. 3 shows a sectional view of the titanium/adhesive/carbon bond of the present invention. A standard surface treatment of the carbon is used when bonding or co-curing to the primered titanium surface since the bond on the carbon side needs no special treatment. FIG. 3 shows a beta titanium alloy layer 50 that has been sandblasted and then coated with a platinum layer 54 on one side. During the aging process the titanium becomes chemically active and starts to absorb the platinum which creates a titanium platinum alloy layer 52 that serves to bond the platinum coating 54 to the titanium layer 50. The platinum layer 54 is then coated with a primer layer 56 which in turn is coated with adhesive layer 58. Now the carbon layer 60 can be bonded to the adhesive layer 58 in the standard matter such as heating the carbon composite layer including a layer of adhesive to 350° F. for approximately one hour. The curing and bonding temperatures and pressures for each adhesive and corresponding carbon fiber are generally available through the manufacture of the carbon composite.

Using this method, the following aircraft parts can be successfully made to meet their strength requirements and at the same time reduce their weight by approximately 50–75%. This weight saving is crucial to the continued increase in efficiency for a modern airliner. This invention also has the advantage of reducing weight and at the same time increasing damage tolerance. For instance, an airplane skin made of a carbon/titanium composite will have a reduced tendency to tear apart in the event of an explosion or gun shot through the skin. Another advantage of this type of composite is that it increases the ability to fasten sheets of the composite to one another. If a composite only uses carbon epoxy, then the portion of the fastener that is fastened to the carbon has a tendency to pull through and not make an effective joint. The various advantages for making each of the following aircraft parts with a beta titanium alloy and a carbon fiber composite will now be explained.

Figure 4:
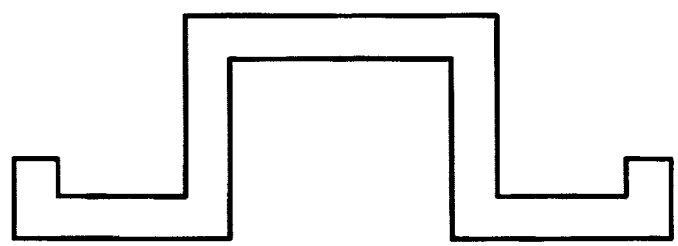
FIG. 4 shows the cross section of a prior art spar and FIG. 5 shows a titanium spar that has been reinforced with graphite to form a composite structure that offers a 50% weight reduction over current materials been used.
Figure 5:
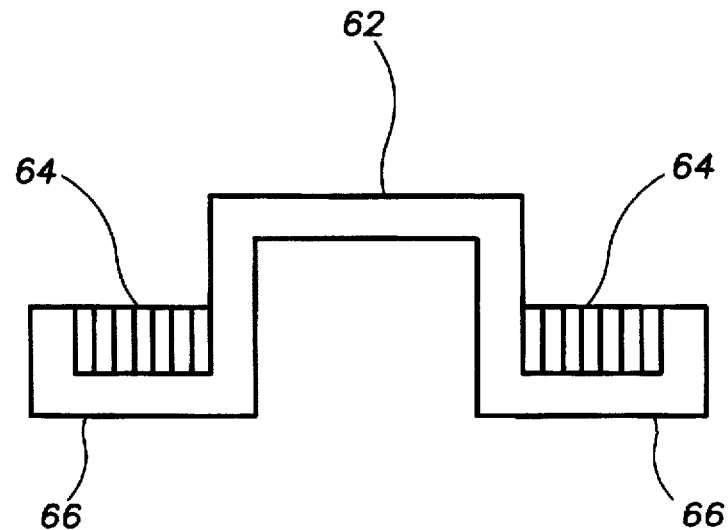

There are several basic parts used in airliners that exemplify the advantage of this invention. These parts are a hat section stiffener, a plate and a tube. A typical hat section, shown in FIG. 4, is made of 7075-T6, 0.073" aluminum and weighs 0.46 lbs./linear foot. When replaced with a TIME-TAL® 15-3 shell 62, shown in FIG. 5, and a graphite/epoxy strips 64 bonded to the flange sections 66, the replacement structure will have similar strength and stiffness but weights only 0.20 lbs./linear foot. When made into a plate, the carbon/titanium composite can be made either with the carbon in an isotropic pattern or unidirectional pattern. If most of the structures stress is unidirectional then a plate can be made of thin titanium strips and unidirectional carbon composites. The cross section of a 5 layer laminated plate is shown in FIG. 6 in which the plate 68 is 0.090" thick and has unidirectional tensile properties of over 300,000 psi. To get the same strength an aluminum plate would have to be 4½ times as thick (0.415") and 4½ times as heavy.

FIG. 6 shows the five layer composite in which layers 70, 74 and 78 are 0.010 inches thick of beta titanium alloy. The layers 70 and 78 have one side of their surfaces 71 and 77 respectively prepared by sandblasting, platinum coating and priming before bonding to their respective graphite layers 72 and 76. The beta titanium alloy layer 74 has both its surfaces prepared by the above method before bonding to the graphite composite layers 72 and 76. As shown in FIG. 1, this combination of beta titanium alloy and unidirectional graphite composite produces a superior specific strength of 3,040,000 inch-lbs. per inch. This results in a superior specific strength compared to other materials commonly used for aerospace construction.

All structures have the additional advantage of being able to vary the amount and orientation of the carbon fiber in order to put the required strength where it is needed and not to add unnecessary weight in lightly stressed sections.

FIGS. 1–6 and the Description of the Preferred Embodiment of the Invention describe the invention as best understood at the time of filing and are not intended to limit the use and application of the invention to aircraft structures. Various changes and modifications will occur to those skilled in the art. The invention has been presented with regard to specific details and it should be noted that many details may be altered without departing from the scope of the invention as defined in the following claims.

What is claimed:

1. A method of preparing a carbon-titanium composite comprising the steps of:
   (a) providing a beta titanium alloy having a surface with an area;
   (b) coating the surface of the beta titanium alloy with a metal selected from the group consisting of platinum and the functional equivalent of platinum as a coating material, to produce a coated titanium alloy;
   (c) heating the coated beta titanium alloy at a temperature for a time to produce an aged coated beta titanium alloy; and
   (d) adhering a carbon composite having a strength to modulus of elasticity ratio to the aged coated beta titanium alloy;
   wherein the heating step imparts to the coated beta titanium alloy a yield strength to modulus of elasticity ratio that is substantially similar to the strength to modulus of elasticity ratio of the carbon composite.

2. The method of claim 1, additionally comprising the step of abrading the surface of the beta titanium alloy to increase the area of the surface after step (a).

3. The method of claim 1, additionally comprising the step of priming the aged surface with a primer after step (c).

4. The method of claim 1, wherein the adhering step, step (d), comprises applying an adhesive to the aged coated beta titanium alloy.

5. The method of claim 4, additionally comprising the step of bonding the carbon composite to the adhesive by heating the carbon composite.

6. The method of claim 1, wherein the beta titanium alloy is selected from the group consisting of (Ti—15V—3Cr—3Sn—3Al) and (Ti—15Mo—3Al—3Nb).

7. The method of claim 1, wherein the temperature of step (c) is approximately 950° F. and the time of step (c) is approximately 8 hours.

8. A method of making an airplane part, comprising the steps of:
   (a) preparing a carbon-titanium composite according to the method of claim 1; and
   (b) incorporating the carbon-titanium composite into an airplane part.

9. The method of making an airplane part of claim 8, wherein the airplane part of step (b) is selected from the group consisting of airplane skin, a hat section stiffener, a plate and a tube.

10. A method of making an airplane, comprising the steps of:
    (a) preparing an airplane part according to the method of claim 8; and
    (b) incorporating the part into an airplane.

11. A method of making an airplane, comprising the steps of:
    (a) providing a carbon-titanium composite according to the method of claim 1;
    (b) utilizing the carbon-titanium composite to produce an airplane part; and
    (c) incorporating the part into an airplane part.

12. The method of making an airplane of claim 11, wherein the airplane part of step (b) is selected from the group consisting of airplane skin, a hat section stiffener, a plate and a tube.

* * * * *